Oct. 29, 1929.                G. ILLINGWORTH                    1,733,881
           AUTOMATIC MACHINE FOR MANUFACTURING ELECTRIC
                INCANDESCENT LAMPS AND SIMILAR ARTICLES
                       Filed Jan. 19, 1926        9 Sheets-Sheet 3
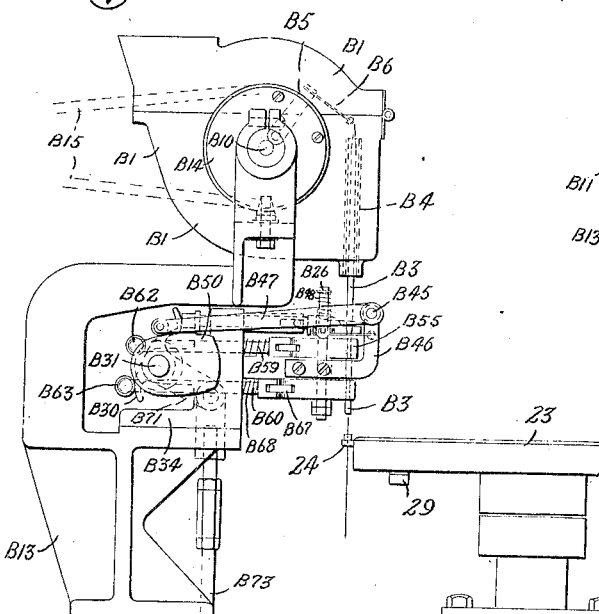
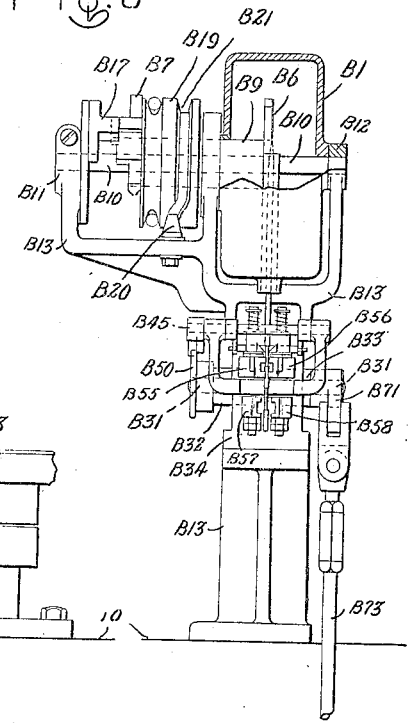
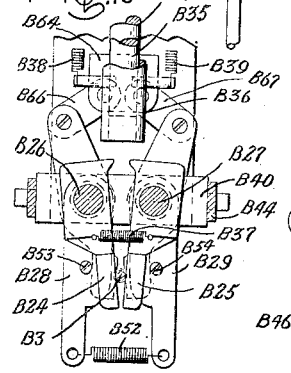
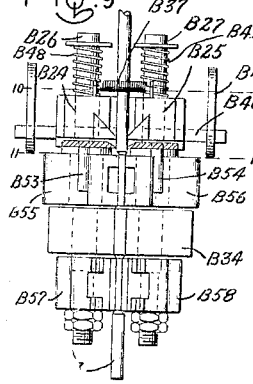
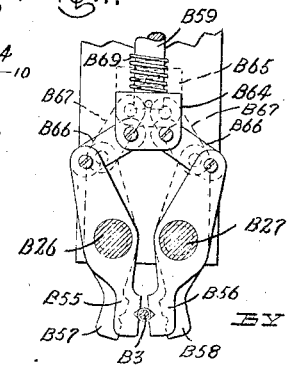

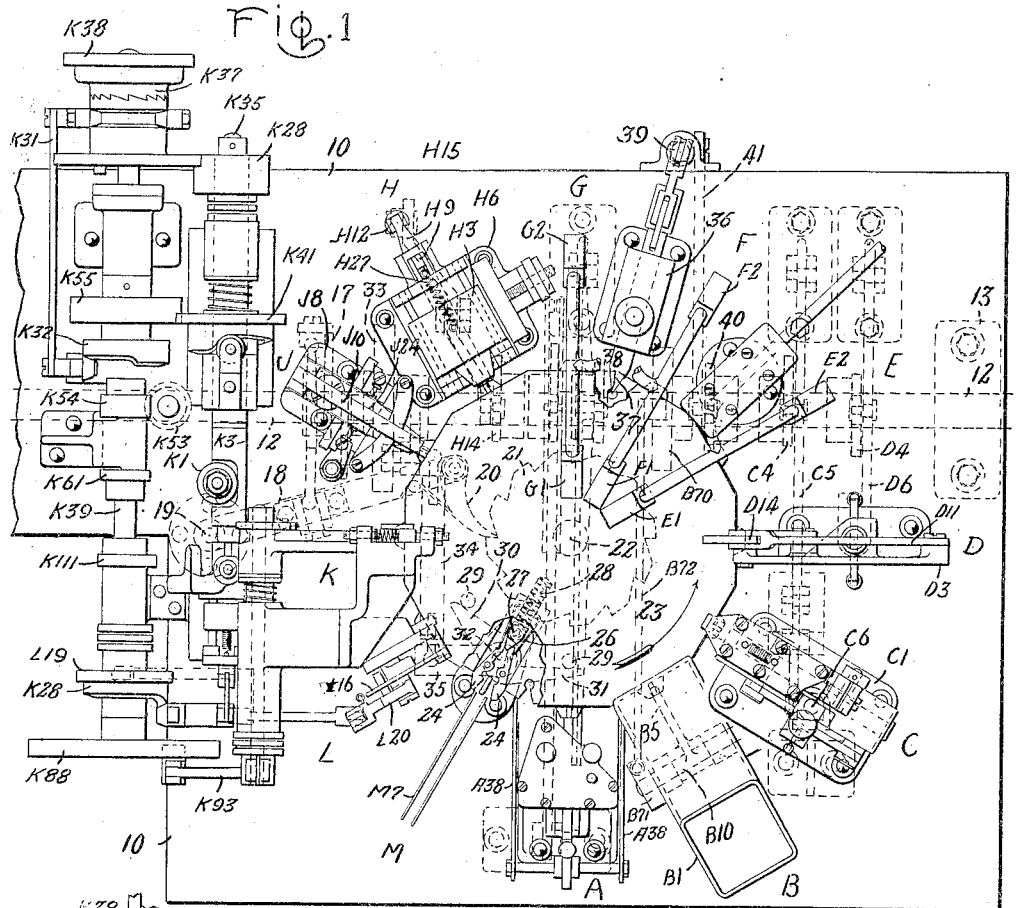

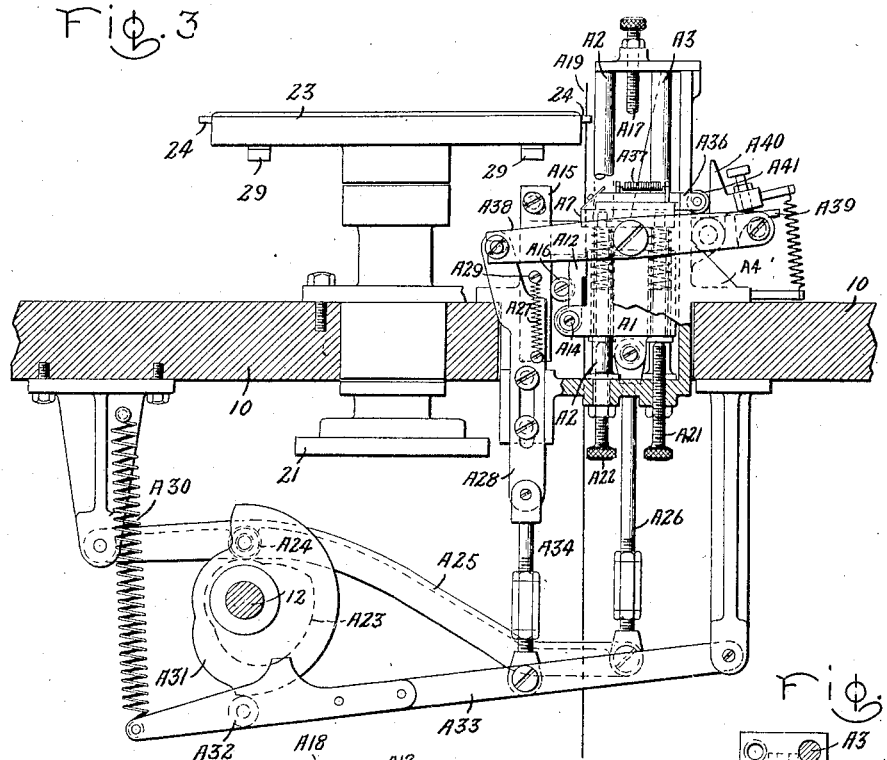
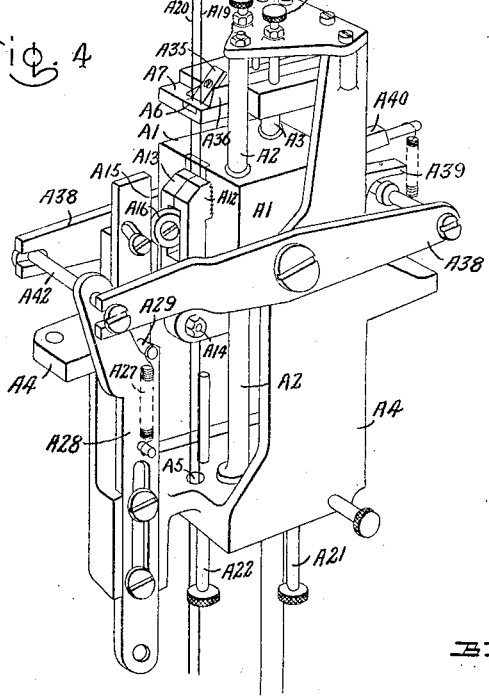
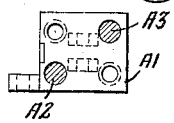
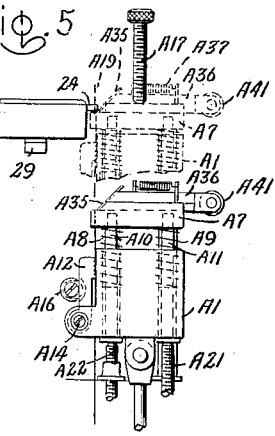

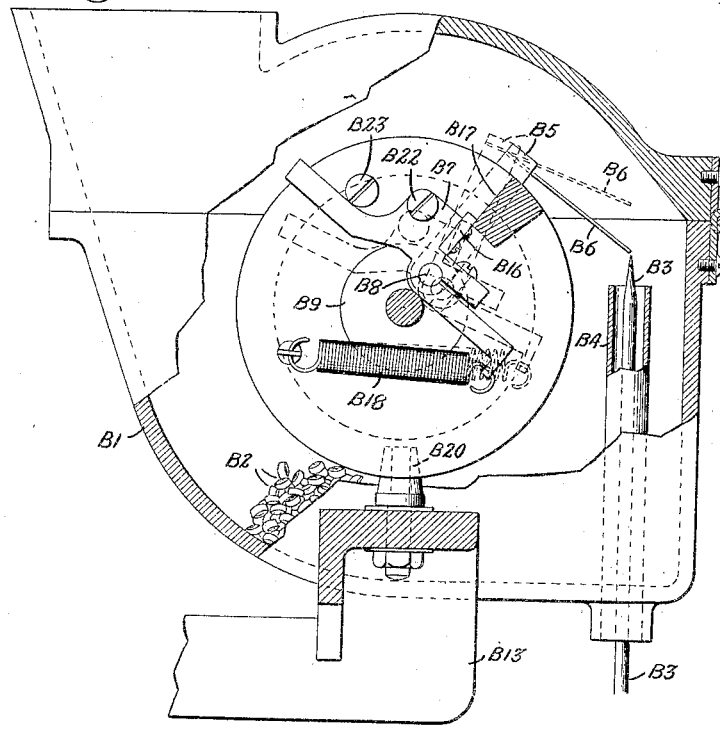
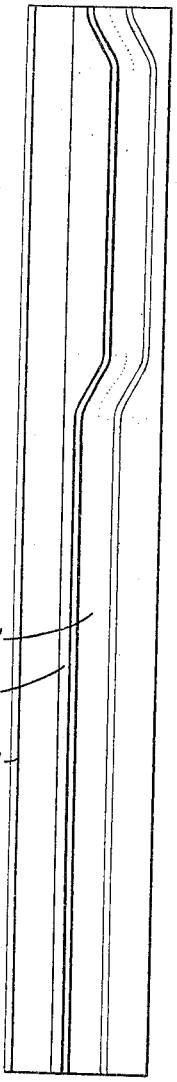
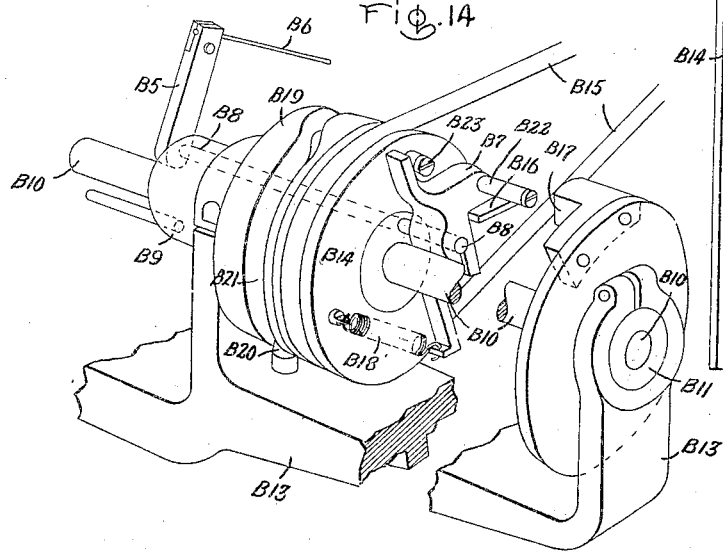

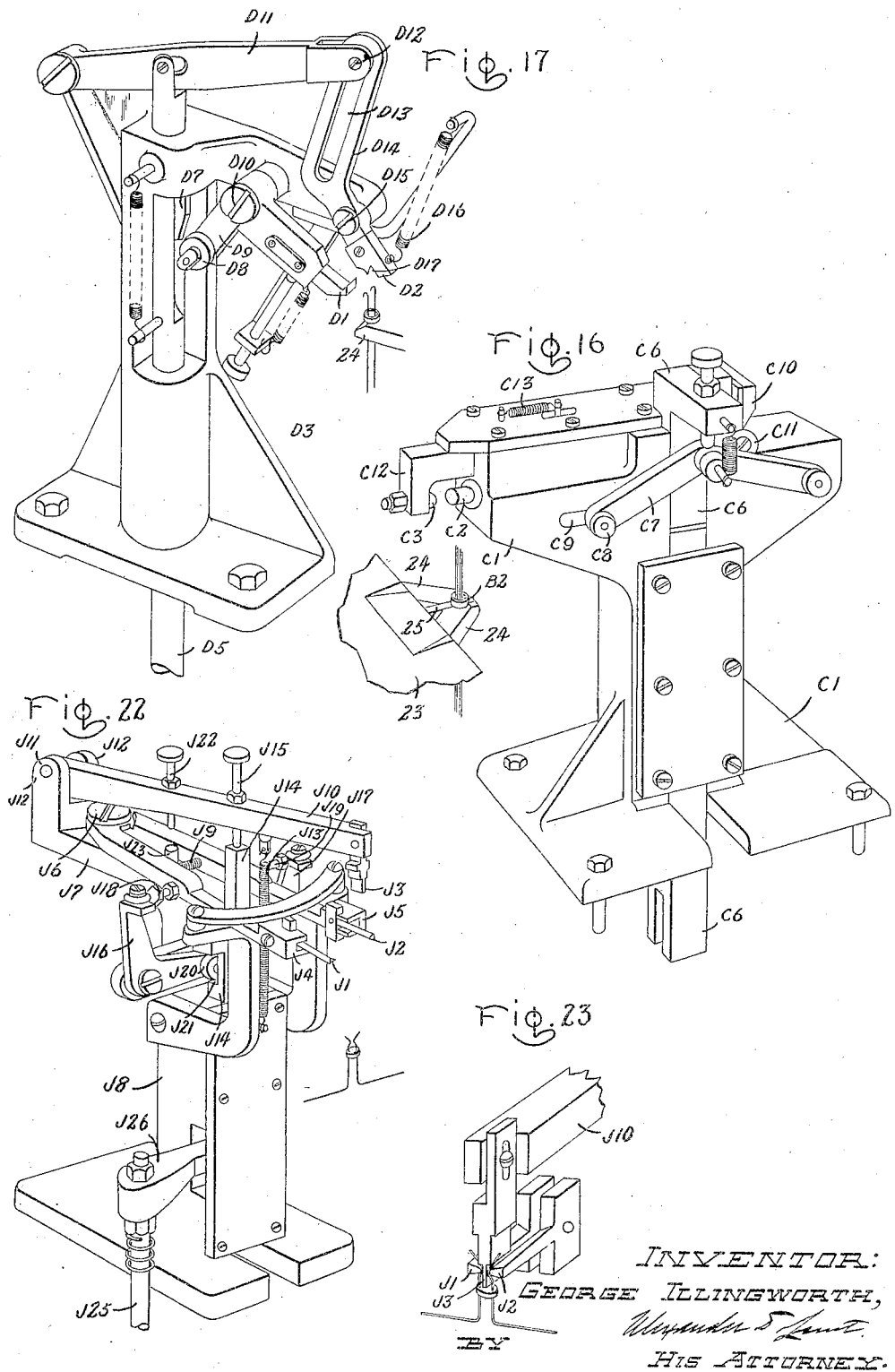

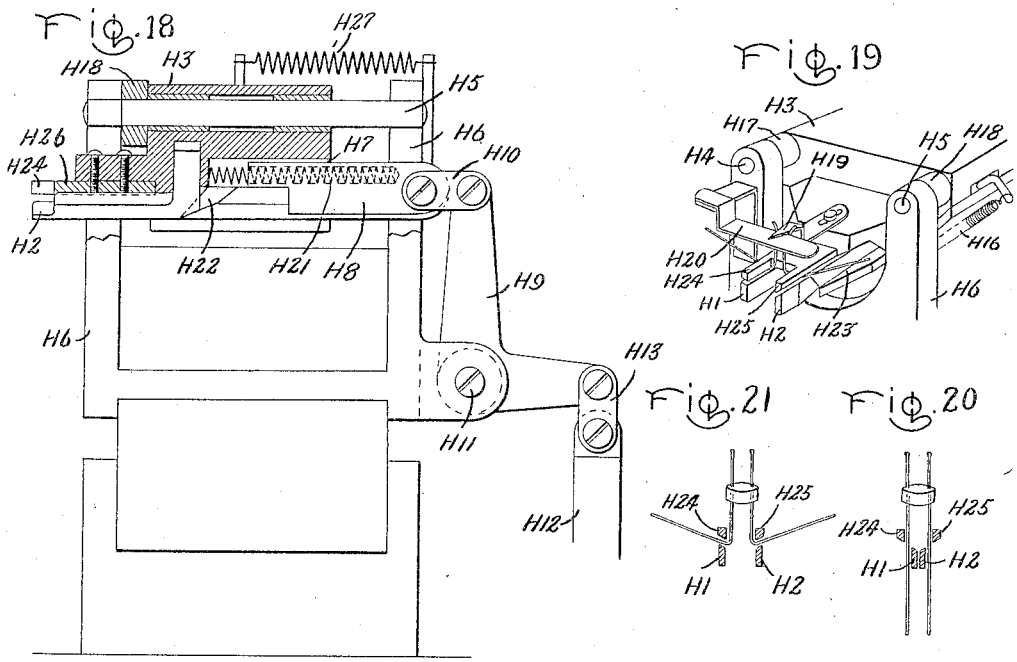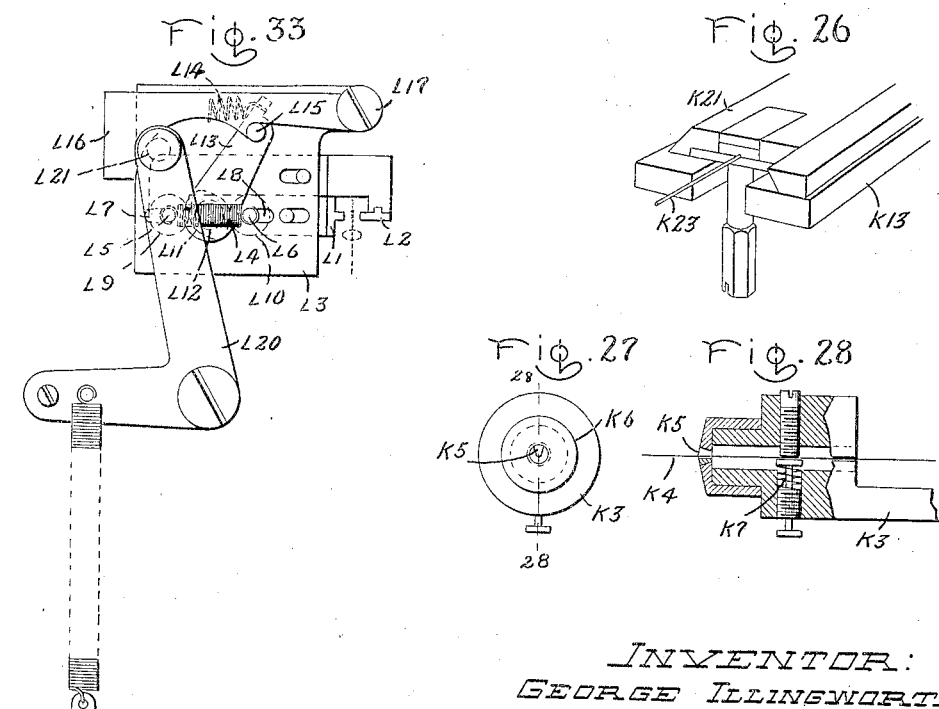

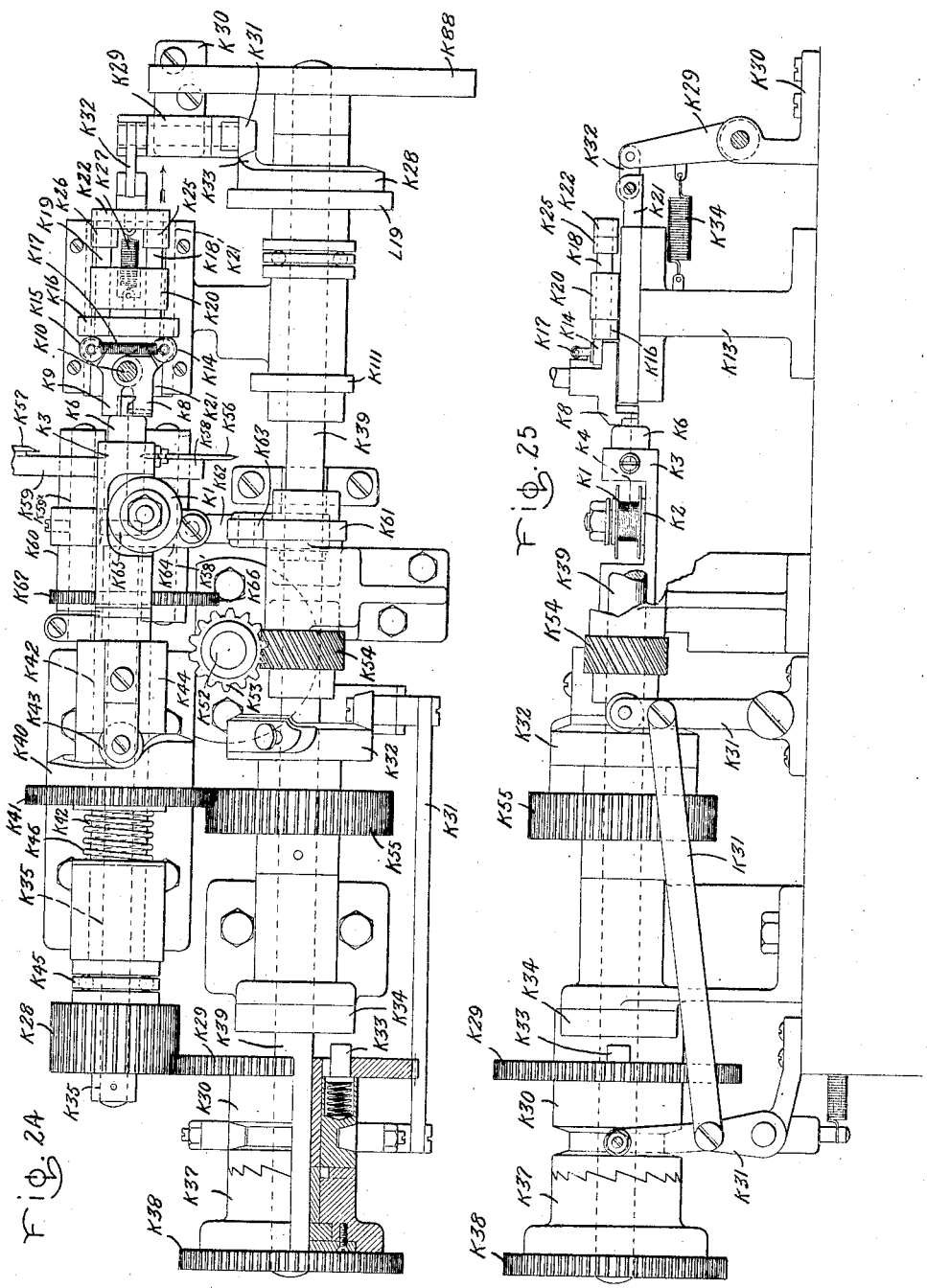

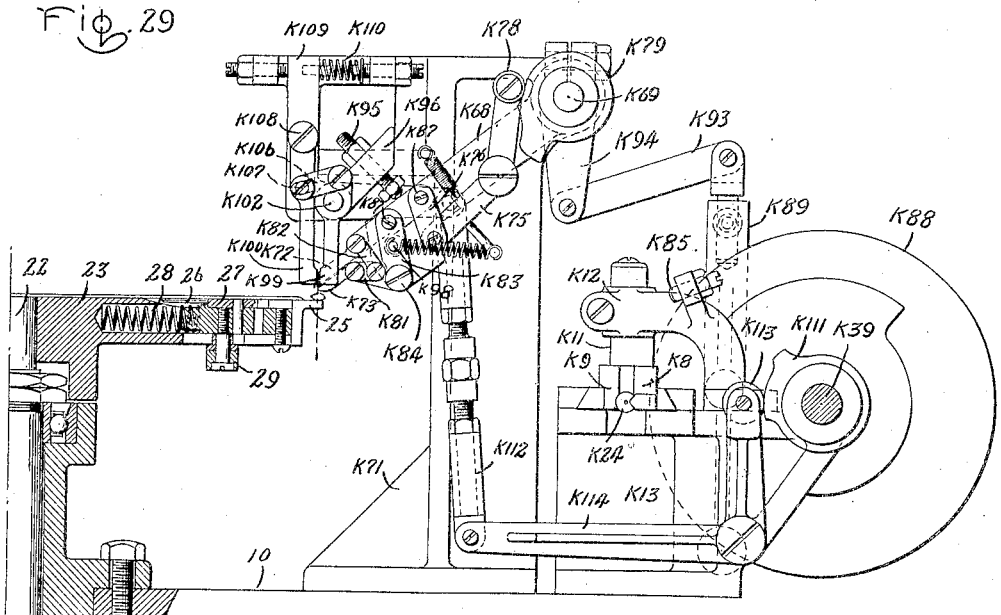
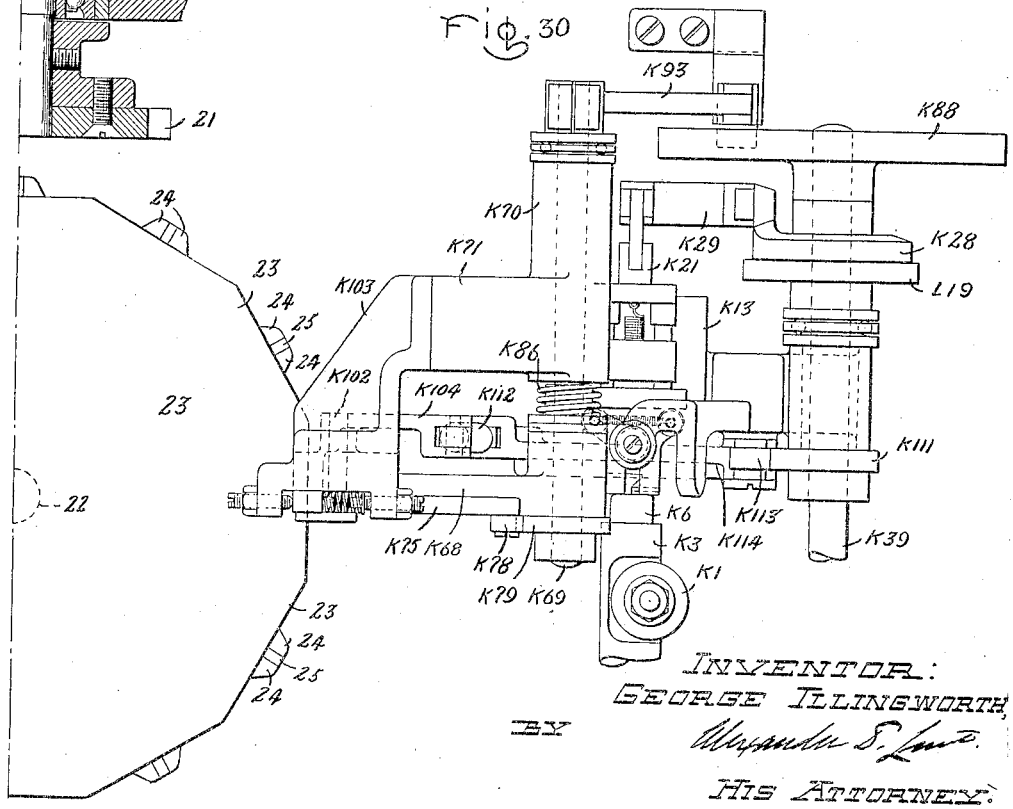

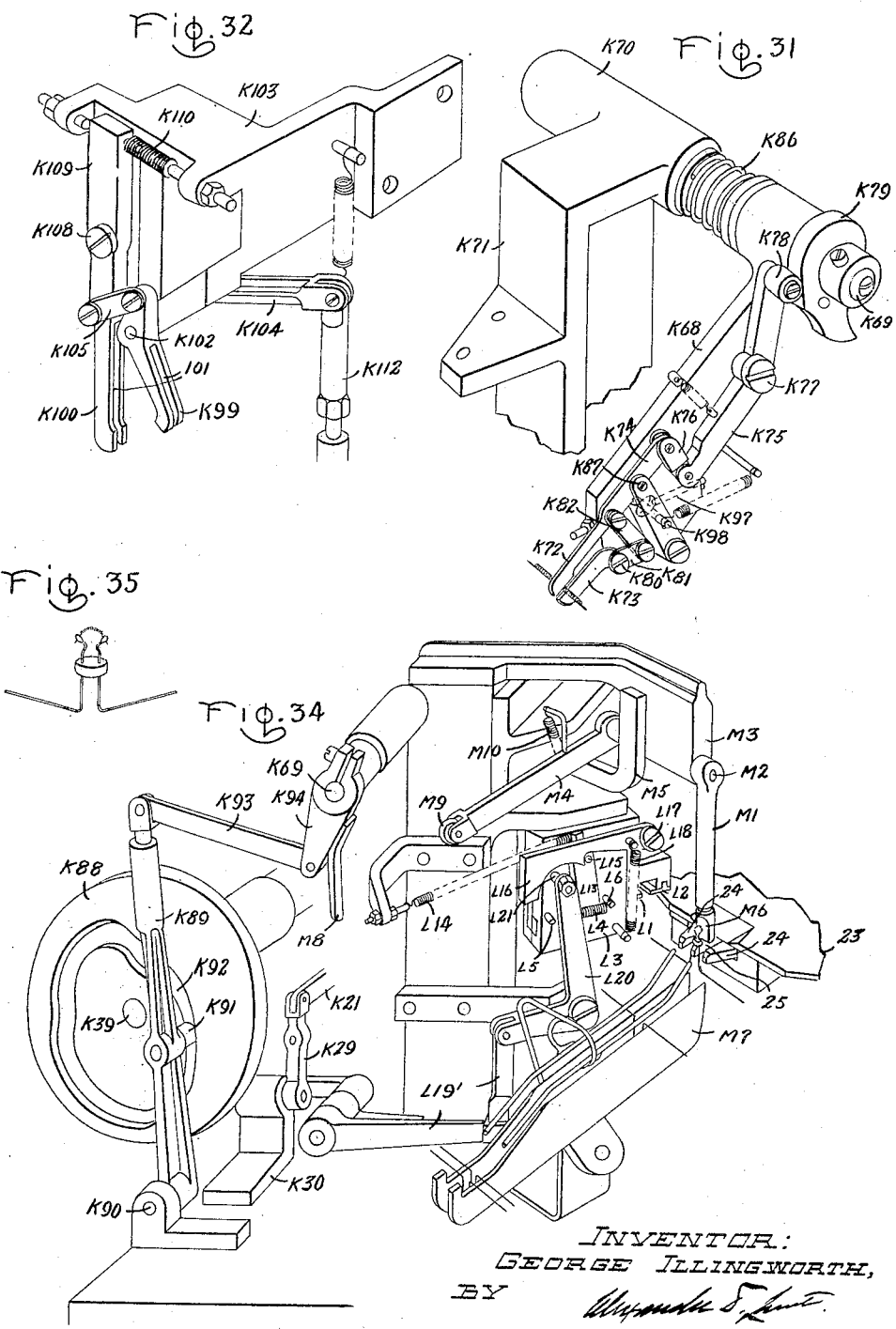

Patented Oct. 29, 1929

1,733,881

UNITED STATES PATENT OFFICE

GEORGE ILLINGWORTH, OF CLEVELAND HEIGHTS, OHIO, ASSIGNOR TO GENERAL ELECTRIC COMPANY, A CORPORATION OF NEW YORK

AUTOMATIC MACHINE FOR MANUFACTURING ELECTRIC INCANDESCENT LAMPS AND SIMILAR ARTICLES

Application filed January 19, 1926. Serial No. 82,370.

My invention is particularly adapted for manufacturing lamp mounts of the type comprising two parallel lead wires held together by a glass bead and supporting a short filament to which these leads supply current. This type of mount is used extensively in the manufacture of miniature lamps such as flashlight, Christmas tree, and certain types of automobile lamps.

According to my invention, I provide a rotatable carrier having mounted thereon a number of holders each adapted to receive and hold a pair of substantially parallel lead wires. The rotatable carrier serves to present the lead wires in succession to various operating mechanisms located in the path of travel of the said carrier and each adapted to perform a particular operation upon the lead wires. My invention also includes a filament wire coiling means, means for transferring the completed filament coils therefrom to the lead wires, and means for uniting said coils to the said lead wires.

The mount making machine, for the most part, is of the same general type as that disclosed in the application of Michael E. McGowan, Serial No. 517,620, filed November 25, 1921, and the coiling mechanism is of the same general type as that disclosed in my prior application, Serial No. 649,784, filed July 6, 1923, for a coiling and bending machine. The improvements comprised by my invention and their advantages will appear from the following description of an embodiment thereof and from the accompanying drawing in which Fig. 1 is a plan view of a machine embodying my invention; Fig. 2 is a partial elevation showing a portion of the driving mechanism; Fig. 3 is an enlarged elevation partially in section of my improved wire feeding mechanism; Fig. 4 is a perspective view thereof; Fig. 5 is a fragmentary elevation of the wire feeding mechanism in two positions; Fig. 6 is a plan view of the wire feeding block; Fig. 7 is a side elevation of the automatic bead feeding mechanism; Fig. 8 is a view at right angles thereof; Fig. 9 is an enlarged front elevation of a portion of the bead feeding mechanism showing the various gripping and bead holding jaws; Fig. 10 is a horizontal section along the line 10—10 of Fig. 9; Fig. 11 is a horizontal section along the line 11—11 of Fig. 9; Fig. 12 is a perspective view of a part of the bead feeding mechanism; Fig. 13 is an enlarged side elevation of the bead feeding hopper with certain portions broken away; Fig. 14 is a fragmentary perspective view showing the bead carrying arm operating cams; Fig. 15 is a developed view of the grooved reciprocating cam; Fig. 16 is a perspective view of the lead wire flattening mechanism; Fig. 17 is a perspective view of the lead wire hook making mechanism; Fig. 18 is an elevation partially in section of the mechanism for spreading and shaping the lower ends of the lead wires; Fig. 19 is a fragmentary perspective thereof; Fig. 20 is a diagrammatic view showing the position of the spreading jaws with relation to the lead wires prior to the spreading operation; Fig. 21 shows the position of the spreading jaws after the spreading operation is completed; Fig. 22 is a perspective view of the mechanism for shaping the lead wires the proper width for mounting; Fig. 23 is an enlarged fragmentary perspective of a detail thereof; Fig. 24 is a plan view of the filament wire coiling mechanism; Fig. 25 is an elevation thereof with certain parts broken away; Fig. 26 is a fragmentary perspective showing the wire coiling mandrel and holding means therefor; Fig. 27 is a front view of the filament wire head; Fig. 28 is a vertical section along the line 28—28 of Fig. 27; Fig. 29 is an elevation of the filament coil transfer arm and operating mechanism therefor; Fig. 30 is a plan thereof; Fig. 31 is a perspective view of the filament coil transfer arm; Fig. 32 is a perspective view of the preliminary clamping jaws; Fig. 33 is an elevation of the final clamping jaws; Fig. 34 is a perspective view showing the cam for operating the filament coil transfer arm and mechanism for unloading the completed mounts; and Fig. 35 is an elevation of a completed mount.

Referring now to Figs. 1 and 2, it will be seen that the various parts are mounted on a base or table 10 supported by means of a plurality of legs 11, one of which is shown in Fig. 2. The driving mechanism is mounted underneath the top of the base or table 10 and comprises a counter shaft 12 rotatably supported in bearings carried by the brackets 13. The shaft 12 is driven from an outside source such as a motor (not shown) through the pulley 14, shaft 14′, worm 15, and gear 16. For imparting an intermittent or step by step movement to a movable carrier for the mounts, the counter shaft 12 carries a cam 17 (Fig. 1) which is so shaped as to operate a swinging arm 18 pivotally mounted at 19. The arm 18 carries a pawl 20 which co-operates with a ratchet wheel 21 secured to the lower end of a vertical shaft 22. This vertical shaft extends up through the base 10 and has mounted on its upper end a rotatable carrier or table 23 which carries a mount holder through a number of positions in succession and to which an intermittent or step by step movement is imparted by the mechanism just described.

By means of a travelling carrier such as the rotatable table 23, each mount during its manufacture is brought into operative relation to different mechanisms in succession and is held there stationary for a short time while each mechanism automatically performs some operation on the mount. In the particular machine illustrated, the driving mechanism is so designed that each mount holder stops in twelve different positions during one complete rotation of the table 23 although a greater or less number of positions may be used, if desired.

The two leads, or lead wires, of the mount are held in place and substantially parallel during the various operations of making the mount by means of a travelling holder mounted on the table 23. In this particular machine twelve holding heads are secured to the rotating table 23 to project radially therefrom, each head consisting of a pair of movable projecting holding jaws 24 which are pivoted near the middle and grip opposite sides of a separator 25 (Figs. 1, 29, and 30) rigidly secured to the edge of the table to project radially from it. The holding jaws are normally held open by a spring 26, and are positively closed by a spring actuated closing means such as a wedge 27 which is forced by a spring 28 into closing position between the ends of the holding jaws to close them upon the separator 25. The wedge 27 is pulled back to permit the holding jaws to open under the influence of the springs 26 by some suitable actuating mechanism which, as shown in Figs. 1 and 29, engages a pin 29 secured to the wedge 27 and projecting below the lower surface of the rotating table 23. At the discharge position where the finished mount is to be released, the wedge 27 is pulled back and the jaws are automatically opened because the travel of the table 23 causes the pin 29 to ride along the cam face of the arm 30 mounted underneath the table 23 and shown in dotted lines in Fig. 1. As the jaws move from the discharge position, the pin 29 rides off the cam face thus allowing the jaws to close and remain closed until the holding head arrives at the next position which is station A, Fig. 1. The jaw controlling mechanism comprises the arm 30 having an extension 31 which rests against one of the pins 29 at station A. The arm 30 is rotatably mounted at the end of a vertical shaft 32 and is actuated from a cam 33 on the counter shaft 12 through the rod 34 which is connected to the arm 35 fastened to the shaft 32. The shape and timing of the cam 33 is such that at the proper time the extension 31 of the arm 30 is moved inwardly toward the center of the table forcing the pin 29 back, causing the jaws 24 to open and remain in that position until they receive a supply of wire which is to form a part of the mount after which the jaws are closed and the table 23 is rotated to the next position.

The leading-in wires from which the leads of the mounts are made, are automatically placed side by side in the jaws 24 at station A by a suitable wire feeding mechanism, such as that illustrated in Figs. 3, 4, 5 and 6. At this station the jaw controlling mechanism holds back the pin 29, which in turn holds back the wedge 27, allowing the holding jaws to remain open. The two leading-in wires preferably of considerable length, are fed from spools by means which place the ends of the wires on opposite sides of the separator 25 and between it and the holding jaws. These wires are fed automatically by the feed block $A^1$ which is slidably mounted on the rods $A^2$ and $A^3$ supported by the standard or housing $A^4$ carried by the base 10. The wires extend up through a hole $A^5$ in the standard and pass along the face of the block $A^1$, continuing upward through a die $A^6$ carried by block $A^7$, which is resiliently supported by springs $A^8$ and $A^9$ surrounding the rods $A^{10}$ and $A^{11}$ extending from the block $A^1$. As the block moves upward, a pair of toothed gripping members $A^{12}$ and $A^{13}$ pivotally mounted at $A^{14}$ are forced inwardly by means of a track $A^{15}$, which bears against a roller $A^{16}$ carried by one of the toothed members, causing them to grip and carry the wires upward. The block $A^1$ and block $A^7$ move upward together until the block $A^7$ strikes against the adjustable stops $A^{17}$ and $A^{18}$. At this point the wires are flush with the die $A^6$, which is now directly beneath the open jaws 24 waiting at station A to receive the said wires. The block $A^1$ continues to move upward against the action of the springs $A^8$ and $A^9$ until the upper ends of the wires $A^{19}$ and $A^{20}$ pass between the jaws 24 and extend upward therefrom the required distance, as shown in dotted lines in Fig. 5. At the end of the upward movement of the block $A^1$, the holding jaws close about the wires while the blocks $A^7$ and $A^1$ are lowered during which time the track $A^{15}$ is raised so as to remove pressure from the roller $A^{16}$, allowing the toothed members to slip downward along the wires. The block $A^1$ moves downward until it strikes the adjustable stops $A^{21}$ and $A^{22}$, bringing the block $A^7$ to a position where it is desired to cut off the wires, as shown in Fig. 3. The raising and lowering of the feed block $A^1$ is accomplished by means of a cam $A^{23}$, which operates the roller $A^{24}$, arm $A^{25}$, and rod $A^{26}$. The track $A^{15}$, which is slidably mounted on the standard $A^4$, is normally held against the roller $A^{16}$ by means of a spring $A^{27}$, and at the proper time is raised out of contact with the roller by means of a rod $A^{28}$ striking against a pin $A^{29}$ extending from the track $A^{15}$. The rod $A^{28}$ is raised and lowered against the action of a spring $A^{30}$ by means of a cam $A^{31}$, which operates the roller $A^{32}$, arm $A^{33}$, and adjustable rod $A^{34}$.

The severing of the leading-in wires takes place when the feed block $A^1$ is in its lowermost position, as shown in Fig. 3. This is accomplished by means of an automatic cutting mechanism which comprises a cutting blade $A^{35}$ carried by a block $A^{36}$ slidably mounted on top of the block $A^7$. This forward movement causes the blade $A^{35}$ to pass over the die $A^{36}$, thus shearing off the wires flush with the said die after which the block $A^{36}$ and blade $A^{35}$ are returned to their normal positions by the spring $A^{37}$, as shown in Fig. 5. The forward movement of the block $A^{36}$ is caused by the tilting of the arms $A^{38}$ which raise a pivoted lug $A^{39}$ having resting thereon an adjustable cam block $A^{40}$ whose flat surface butts against a roller $A^{41}$ attached to the end of the block $A^{36}$. The tilting of the arms $A^{38}$ is accomplished by the cam $A^{31}$, roller $A^{32}$, arm $A^{33}$, rod $A^{34}$, rod $A^{28}$, and cross rod $A^{42}$.

The holding jaws which now carry a pair of lead wires of the proper length are advanced to station B where a bead in the shape of a ring of glass is to be placed over the two leads by an automatic bead feeding device located at this station and shown more particularly in Figs. 7, 8, 9, 10, 11, 12, 13, 14, and 15. The bead feeding device comprises a hopper $B^1$ in which are placed a supply of beads $B^2$ (Fig. 13) to be conveyed to a feed stem $B^3$ which extends up through a feed tube $B^4$ supported by the hopper $B^1$. The beads are later removed from the feed stem and placed over the lead wires as they appear at this station. The feed stem is kept constantly supplied with beads by means of a conveyor arm $B^5$, which is caused to rotate in the hopper so as to travel through the beads, thereby picking up several beads by means of a pin $B^6$ extending therefrom. The beads are carried to a point shown in Figs. 1 and 13 where they slide off the pin $B^6$ and on to the feed stem, after which the arm $B^5$ is retracted a short distance and moved inwardly out of its normal path of travel so as not to strike the feed stem on its forward travel for a new supply of beads. The retraction of the conveyor arm is accomplished by means of a dog $B^7$ attached to one end of a rod $B^8$, which extends through the hollow shaft $B^9$ and carries at its opposite end the arm $B^5$ (Fig. 14). The shaft $B^9$ is slidably and rotatably mounted on axle $B^{10}$ extending between the bearings $B^{11}$ and $B^{12}$ formed in the standard $B^{13}$. The said shaft is continuously rotated by means of a pulley $B^{14}$, which is driven from the counter shaft 12 through the belt $B^{15}$. As the pin $B^6$ reaches the position shown in full lines in Fig. 13, a plate $B^{16}$ attached to the dog $B^7$ strikes against the face of a stationary cam $B^{17}$, thus forcing the dog backward against the action of spring $B^{18}$, which in turn carries the arm $B^5$ and pin $B^6$ backward through the rod $B^8$ to the position shown in dotted lines in Fig. 13. In order to move the arm $B^5$ out of its normal path of travel, a grooved cam $B^{19}$ is provided and is shown developed in Fig. 15. A stationary roller $B^{20}$ mounted on the standard $B^{13}$ extends into a groove $B^{21}$ of the cam $B^{19}$, which is so designed that when the conveyor arm is retracted the proper distance, it is moved inwardly where it travels a short distance so as to escape striking the feed stem $B^3$ and feed tube $B^4$ after which it is moved forward to its normal path of travel so as to collect a new supply of beads and place them on the feed stem. As the conveyor arm moves forward, the plate $B^{16}$ rides off the cam $B^{17}$. A pin $B^{22}$ extending from the dog $B^7$ rides under a portion of the cam $B^{17}$, thus arresting any violent motion which might occur when the spring $B^{18}$ pulls the dog back to its normal position against the stop $B^{23}$ extending from the pulley $B^{14}$.

The feed stem $B^3$ is supported by means of two sets of jaws which alternately open and close so that when each bead is released by other holding jaws, it may be free to pass down the stem on to a pair of lead wires which register with the lower end of the said stem. As the beads slide down the feed stem, the first or foremost bead comes in contact with a pair of feeding jaws $B^{24}$ and $B^{25}$ slidably and rotatably mounted on pins $B^{26}$ and $B^{27}$, and, as shown in Figs. 9 and 10, are in the closed position. At the proper time these jaws are opened and raised the height of one bead prior to closing so as to allow the first or foremost bead to pass down the stem where it rests on top of a pair of intermediate jaws $B^{28}$ and $B^{29}$. After the jaws $B^{24}$ and $B^{25}$ have closed, they continue to move upward forcing the line of beads up the feed stem toward the hopper. This avoids interference with other mechanisms which are about to operate to allow the first or foremost bead to pass down the stem. The opening and closing of the feeding jaws $B^{24}$ and $B^{25}$ are accomplished by means of a rocker arm $B^{30}$ (Figs. 7 and 12) rotatably mounted on a shaft $B^{31}$ supported in bearings $B^{32}$ and $B^{33}$ formed in the support $B^{34}$ carried by the standard $B^{13}$. A plunger $B^{35}$ slidably mounted in the support $B^{34}$ extends through a bushing $B^{36}$ carried by the said support and is so aligned with the feeding jaws that when it is pushed forward by the rocker arm it strikes against the rear faces of the jaws, thereby causing them to open against the action of spring $B^{37}$ attached to and extending between the said jaws. The plunger is returned to its normal position by means of springs $B^{38}$ and $B^{39}$, the one ends of which are attached to the plunger and their other ends attached to the support $B^{34}$. The jaws $B^{24}$ and $B^{25}$ rest on a saddle $B^{40}$, which is carried by a pair of lifting arms $B^{41}$ and $B^{42}$ through the links $B^{43}$ and $B^{44}$. The lifting arms are fastened to a horizontal shaft $B^{45}$ rotatably mounted in bearings formed in the bracket $B^{46}$ attached to the support $B^{34}$. Attached to one end of the shaft $B^{45}$ is a lever arm $B^{47}$, the raising of which causes the shaft to rotate so as to lift the saddle $B^{40}$ by means of the lifting arms and links attached thereto. As the saddle is lifted it carries the jaws $B^{24}$ and $B^{25}$ upward against the action of springs $B^{48}$ and $B^{49}$. A cam $B^{50}$ mounted on the shaft $B^{31}$ raises and lowers the lever arm $B^{47}$ through a roller $B^{51}$.

The first or foremost bead now rests upon the top of the intermediate jaws $B^{28}$ and $B^{29}$ which are pivotally mounted on the pins $B^{26}$ and $B^{27}$, and held in closed position by means of a spring $B^{52}$. A pair of short pins $B^{53}$ and $B^{54}$ extend downwardly from the intermediate jaws and rest against the sides of the feed stem holding jaws $B^{55}$ and $B^{56}$ so that when these jaws are opened the said pins are forced outward causing the intermediate jaws also to open and allow the bead resting thereon to pass down the feed stem to the lowermost feed stem holding jaws $B^{57}$ and $B^{58}$ which are now in the closed position. In order that the bead may now pass from its resting place on top the lowermost feed stem holding jaws, the next step is to open these jaws so as to allow the bead to pass down over the two lead wires which are in register with the lower end of the said feed stem. As this final operation takes place, the jaws are in the position shown in Figs. 7, 8, 9, 10 and 11.

The opening and closing of the upper and lower feed stem holding jaws are accomplished by means of the rocker arm $B^{30}$ which is slotted at $B^{59}$ so as to receive the operating rods $B^{60}$ and $B^{61}$ which have attached thereto the rollers $B^{62}$ and $B^{63}$. The operating rods are slidably supported in the support $B^{34}$ and have attached to their opposite ends the blocks $B^{64}$ and $B^{65}$, which are attached to the rear ends of the feed holding jaws through two pairs of pivotally mounted links $B^{66}$ and $B^{67}$. The rocker arm $B^{30}$ is so designed that when it is rocked inwardly toward the center of the mounting machine the lower operating rod $B^{61}$ is moved outwardly against the action of a spring $B^{68}$ thereby causing the opening of the lower jaws $B^{57}$ and $B^{58}$ during which time the upper operating rod $B^{60}$ is in its inward position and the upper jaws $B^{55}$ and $B^{56}$ are held in closed position by means of a spring $B^{69}$, as shown in Fig. 11. The rocker arm $B^{30}$ and lifting cam $B^{50}$ are both mounted on shaft $B^{31}$, said shaft being operated by means of a bead feeding device operating cam $B^{70}$ mounted on the counter shaft 12. The cam $B^{70}$ raises and lowers the arm $B^{71}$ through the lever $B^{72}$ and push rod $B^{73}$. The bead now being placed over the two lead wires by the automatic bead feeding device above described, the mount holder is carried along by the step by step movement of the table 23 to the next station indicated as C on Fig. 1.

The next operation is to flatten the upwardly projecting ends of the lead wires so as to enlarge the bearing surface where the ends of a filament are later to be attached. This operation is automatically performed at station C by an automatic flattening mechanism, a perspective view of which is shown in Fig. 16. This mechanism comprises a stationary standard or housing $C^1$ which contains a pair of slidable anvils $C^2$ and $C^3$, said anvils being caused to move toward each other with sufficient force so as to flatten the upper ends of the lead wires. The operation of the anvils is accomplished by means of a cam $C^4$ mounted on the counter shaft 12 and operating a lever arm $C^5$ (Fig. 1) to which is attached the push rod $C^6$. As the rod is pulled downwardly it forces the anvil $C^2$ toward the projecting lead wires by means of a link $C^7$ pivotally mounted at one end to the rod $C^6$ and attached at its opposite end to the anvil $C^2$ by means of a pin $C^8$ which extends through a slot $C^9$ located in the housing $C^1$. Simultaneously with the movement of the anvil $C^2$, the anvil $C^3$ is forced toward the lead wires until the two anvils meet on opposite sides thereof with considerable force thereby flattening the projecting ends of the said wires. During the downward movement of the rod $C^6$, a cam block $C^{10}$ carried thereby comes in contact with a roller $C^{11}$ carried by the anvil holder $C^{12}$. The shape of the cam block is such that as it moves downwardly it forces the holder $C^{12}$ backward against the action of a spring $C^{13}$. This backward movement of the holder $C^{11}$ causes the anvil $C^3$ to travel toward the projecting lead wires. The wire flattening operation now being completed, the mount holder is carried to the next station indicated as D on Fig. 1.

At station D is located a hook forming mechanism which automatically bends and forms a hook on both upper ends of the projecting lead wires so that when the ends or legs of a filament are placed in the hooks and the said hooks closed, the filament is securely held by the lead wires. As shown in Fig. 17, the hook forming mechanism comprises a pair of hook forming members $D^1$ and $D^2$ pivotally mounted on a standard $D^3$ and actuated by means of a cam $D^4$ mounted on the counter shaft 12. The said cam raises and lowers the vertical operating rod $D^5$ through the lever arm $D^6$ (Fig. 1). Hooks are formed on the flattened ends of the lead wires on the downward movement of the rod $D^5$ at which time a projecting cam $D^7$ carried by the said rod comes in contact with a roller $D^8$ thus forcing the hook forming member $D^1$ toward the lead wires by means of the crank $D^9$. The said crank is pivotally mounted at $D^{10}$, one arm of which carries the roller $D^8$ and its other arm the forming member $D^1$. As the rod $D^5$ continues downwardly, it forces the other hook forming member $D^2$ in toward the lead wires by means of the pivoted arm $D^{11}$ attached to the end of the said rod. A pin $D^{12}$ carried by the forked end of the arm $D^{11}$ extends through a slot $D^{13}$ formed in the extension $D^{14}$ of the hook forming member $D^2$ so that a continued downward movement of the arm $D^{11}$ causes the hook forming member $D^2$ to rotate about its pivot $D^{15}$ against the action of a spring $D^{16}$. Both hook forming members continue to travel toward each other until the forming member $D^1$ forces the upper ends of the lead wires into the recess $D^{17}$ of the member $D^2$ so as to form a hook on the upper end of each lead wire, as shown in Fig. 17.

After the hooks have been properly formed on the ends of the lead wires, the mount holder is carried to station E where a pair of burners $E^1$ and $E^2$ (Fig. 1) direct a flame upon the glass bead $B^2$ so as to preliminarily heat the same prior to fusing it around the lead wires. The mount holder having paused at station E its allotted time, it is next moved to station F where a second pair of burners $F^1$ and $F^2$ direct a flame upon the glass bead causing it to melt and flow around the lead wires so as to support and hold them at approximately the proper distance apart.

To make sure that in each position of the table 23 a mount holder will be in a definite and correct relation to the various mechanisms which operate upon the mount, I provide an indexing and locking mechanism similar to that shown and described in the McGowan application above referred to and which comprises a housing 36 placed adjacent to station F and carrying a slidable locating bolt 37 provided with a tapered end to enter V shaped notches 38 which, as shown in Fig. 1, are cut in the rim of the rotatable table 23. Any slight inaccuracy in the angular position of the table is corrected when the wedge-shaped end of the locking bolt 37 enters one of the V-shaped notches, the table being firmly locked as long as the locking bolt is firmly seated in the notch. These notches 38 correspond in number to the positions taken by each mount holder during the complete revolution of the table 23. The locking bolt is yieldingly driven into the notches by a push rod 39 driven from the cam 40 through the lever arm 41. The timing of the mechanism is such that the locking bolt enters the V-shaped notch and positions and locks the table prior to the beginning of any operations on the mount, and holds the table firmly in place until after the operations at each station are completed.

At station G, I have shown another pair of burners $G^1$ and $G^2$, which may be used to direct a flame upon the glass bead in case it is desired to complete the fusion of the bead at this station, although these burners may be dispensed with and the fusion of the bead completed at station F.

The lower ends of the lead wires are now bent up into shape so as to facilitate sealing the mount into a lamp. This bending operation is performed at station H by an automatic spreading and shaping mechanism. This spreading and shaping mechanism is best shown in Figs. 18 and 21 and comprises a pair of spreading jaws $H^1$ and $H^2$ slidably mounted in a movable housing $H^3$. The housing is slidably mounted on a pair of rods $H^4$ and $H^5$ carried by a standard $H^6$. Extending into a slot $H^7$ formed in the rear of the housing is a plunger rod $H^8$ connected at one end to one arm of a crank $H^9$ through a link $H^{10}$. The crank is pivotally mounted on the standard at $H^{11}$ and connects at its opposite arm to a reciprocating rod $H^{12}$ through the link $H^{13}$. The reciprocation of the rod is accomplished by means of a cam $H^{14}$ (Fig. 1) mounted on the counter shaft 12. A lever arm $H^{15}$ forms the connection between the said cam and the reciprocating rod. The shape of the cam $H^{14}$ is such that at the proper time it raises the rod $H^{12}$ which through the crank $H^9$ causes the plunger rod $H^8$ to move inwardly carrying with it the housing $H^3$. The jaws $H^1$ and $H^2$ being normally hold in contact with each other by springs $H^{16}$ are moved forward in this position with the housing until they reach a point between the lower ends of the lead wires. When the jaws reach their proper position between the lead wires, as shown in Fig. 20, the housing is arrested in its forward movement by the adjustable stops $H^{17}$ and $H^{18}$ mounted on the rods $H^4$ and $H^5$.

During the forward movement of the housing a spacing blade $H^{19}$ adjustably mounted on the top thereof is forced between the upper ends of the lead wires so as to spread them somewhat in order that they may be in their correct position to be operated upon by a spacing and bending mechanism located at the next station. A brace $H^{20}$ attached to the standard $H^6$ vertically supports the upper ends of the lead wires as the spacing blade is forced between them. As the housing in its forward movement comes to a stop it is in the position shown in Fig. 18 with the front ends of the jaws $H^1$ and $H^2$ extending between the lower ends of the lead wires, as shown in Fig. 20. The plunger rod $H^8$ continues to move forward against the action of a spring $H^{21}$ at which time the wedge-shaped nose $H^{22}$ of the plunger rod forces its way between the rear ends of the jaws which rest thereon, causing them to separate. As the jaws separate they travel up the inclined ways $H^{23}$ formed in the housing. The jaws in their travel carry the lower ends of the lead wires up around a pair of stationary gauge fingers $H^{24}$ and $H^{25}$ which extend from a plate $H^{26}$ carried by the housing $H^3$. The open position of the jaws is clearly shown in Figs. 19 and 21. After the spreading operation is completed the rod $H^9$ is lowered causing the nose of the plunger to be withdrawn from between the rear ends of the jaws which are returned to their closed position by the springs $H^{16}$, only one of which is shown in Fig. 19. The housing is moved backward so as to withdraw the jaws, gauge fingers, and spreading blade out of the path of travel of the mount just operated upon. This backward movement of the housing is accomplished by a spring $H^{27}$.

At station J the upper ends of the lead wires are bent and accurately spaced the proper width so as to receive the filament which is to be mounted thereon at the next station. This automatic forming and spacing mechanism is shown in perspective in Fig. 22 and comprises a pair of horizontally disposed forming blades $J^1$ and $J^2$ and a vertically disposed gauge or spacing member $J^3$, all of which are arranged to be brought into operative relation with the upper ends of the lead wires so as to form and space them as shown in Fig. 23. The forming blades $J^1$ and $J^2$ are adjustably supported in a pair of horizontally disposed arms $J^4$ and $J^5$ rotatably mounted at $J^6$ on a bracket $J^7$ which forms part of the standard $J^8$. The blades are normally open being retained in this position by means of a spring $J^9$ which extends between the arms $J^4$ and $J^5$. The gauge or spacing member $J^3$ depends from an arm $J^{10}$ rotatably mounted at $J^{11}$ between the ears $J^{12}$, which extend from the bracket $J^7$. The arm $J^{10}$ is held in its uppermost position against the action of a spring $J^{13}$ by means of a reciprocating rod $J^{14}$, the top of which bears against the adjustable stop $J^{15}$ carried by the arm $J^{10}$. A pair of cranks $J^{16}$ and $J^{17}$ are pivotally mounted on the standard $J^8$ so that a pair of adjusting screws $J^{18}$ and $J^{19}$ carried by the arms $J^4$ and $J^5$ rest against one arm of each crank. Attached to the other arm of each crank are rollers $J^{20}$ adapted to fit in the slotted portion $J^{21}$ formed in the reciprocating rod $J^{14}$. As the rod $J^{14}$ is pulled down it moves away from the stop $J^{15}$, thus allowing the spring $J^{13}$ to pull the arm $J^{10}$ downwardly at which time the arms $J^4$ and $J^5$ are being moved inwardly toward each other by the rotation of the cranks $J^{16}$ and $J^{17}$ caused by their rollers $J^{20}$ being carried down with the said rod. The arm $J^{10}$ continues to move downwardly until the gauge or spacing member $J^3$ reaches its proper position between the two lead wires, this position being determined by means of an adjustable stop $J^{22}$ which contacts with a stop $J^{23}$ extending from the standard $J^8$. The arms $J^4$ and $J^5$ continue to move toward each other until their blades $J^1$ and $J^2$ contact on opposite sides of the gauge $J^3$ during which time the upper ends of the lead wires are captured by the said blades and forced in against the opposite faces of the gauge thereby being bent and accurately spaced, as shown in Fig. 23. The rod $J^{14}$ is reciprocated by means of a cam $J^{24}$ (Fig. 1), which is mounted on the counter shaft 12 and operates a push rod $J^{25}$ which has an arm $J^{26}$ extending through the standard $J^8$ where it connects with the rod $J^{14}$.

As the mount leaves the lead wire forming and spacing mechanism at station J, it is ready to have the filament applied to it. The rotation of the table 23 carries it to station K adjacent to which is located a mechanism for automatically forming the filament wire into a coil, and cutting it to the proper length. It is then carried toward the upper ends of the lead wires by means of an automatic transfer mechanism. The filament is then attached to the hook ends of the lead wires by means of an automatic clamping device. All of these mechanisms are so timed that the operations of coiling the filament, transferring and attaching it to the lead wires are completed before the table 23 starts to move toward the next station.

The mechanism for automatically forming the filament into coils is of the type disclosed in my prior application Serial No. 649,784, filed July 6, 1923, coiling machine for fine wire. This coiling mechanism is shown more clearly in Figs. 1, 2, 24, 25, 26, 27, 28, 29 and 30, and comprises in general a holder for a reel of filament wire, said holder forming part of a filament wire coiling means which cooperates with a mandrel advancing and retracting means, and a severing means for cutting the wire from the spool after the coil is completed.

Referring to Figs. 24 and 25, it will be seen that the filament wire reel $K^1$ is removably mounted in a holder $K^2$, which is carried by a head $K^3$. The filament wire passes through an aperture $K^4$ in the nose $K^6$ of the head and projects beyond the same a short distance being retained in position by a spring pressed gripping means $K^7$, shown particularly in Figs. 27 and 28. The corresponding end of the mandrel operating mechanism comprises a pair of filament wire gripping jaws $K^8$ and $K^9$ pivotally mounted on a pin $K^{10}$. The said pin is supported in bearing $K^{11}$ carried by bracket $K^{12}$ forming part of a standard $K^{13}$ attached to the bed 10 of the machine, as shown in Fig. 29. Attached to the rear of the jaws $K^8$ and $K^9$ are a pair of rollers $K^{14}$ and $K^{15}$. These rollers are engaged at various times by a cross piece $K^{16}$ so as to close the jaws against the action of spring $K^{17}$. The cross piece $K^{16}$ is attached to the ends of a pair of horizontal rods $K^{18}$ and $K^{19}$ slidably mounted in bearing block $K^{20}$, which forms a part of a plate $K^{21}$. The opposite ends of the rods $K^{18}$ and $K^{19}$ terminate in a cross piece $K^{22}$. The plate $K^{21}$ is slidably mounted in the standard $K^{13}$ and carries a mandrel $K^{23}$, as shown in Fig. 26. Upon the reciprocation of the plate the mandrel is caused to advance or retract through an aperture in a die $K^{24}$ carried by the jaw $K^9$. The advance and retraction of the mandrel through the die occurs only when the jaws are in closed position. As the plate $K^{21}$ moves backward in the direction of the arrow (Fig. 24) the mandrel is withdrawn from the die $K^{24}$, the plate continuing to move backward until the bearing block $K^{20}$ carried by the said plate strikes against the lugs $K^{25}$ and $K^{26}$, forming part of the cross piece $K^{22}$, thereby forcing it and the rods $K^{18}$ and $K^{19}$ backward carrying with them the cross piece $K^{16}$ away from the rollers $K^{14}$ and $K^{15}$, allowing the jaws $K^8$ and $K^9$ to be opened by the spring $K^{17}$. As the bearing block moves backward it compresses a spring $K^{27}$ attached to the said block and to the cross piece $K^{22}$ so that when the plate $K^{21}$ starts to move forward pressure is removed from the spring $K^{27}$. The spring then forces the cross piece $K^{16}$ against the rollers $K^{14}$ and $K^{15}$, thereby closing the jaws so that the die $K^{24}$ will be in position to receive the mandrel $K^{23}$ which is advancing toward it.

The reciprocation of the plate $K^{21}$, which carries the mandrel $K^{23}$, is accomplished by means of a cam $K^{28}$ operating through a U-shaped lever $K^{29}$ pivotally mounted on a standard $K^{30}$. One arm of the lever carries a roller $K^{31}$, which rides on the cam $K^{28}$, the opposite arm of the said lever being connected to the plate $K^{21}$ through a link $K^{32}$, As the roller $K^{31}$ rides upon the rise $K^{33}$ on the cam, the plate $K^{21}$ moves backward (in the direction of the arrow, Fig. 24) against the action of a spring $K^{34}$. As the plate moves backward, the mandrel being carried thereby is withdrawn from the die $K^{24}$ after which the jaws $K^8$ and $K^9$ are opened. After the roller $K^{31}$ passes over the rise in the cam, the plate $K^{21}$ is moved forward by the spring $K^{34}$. The jaws $K^8$ and $K^9$ are then closed and the mandrel is advanced through the die $K^{24}$.

To make a coil, the following is the cycle of movements for the various parts. The jaws $K^8$ and $K^9$ are lined up with the aperture $K^5$ in the nose $K^6$ of the head $K^3$, which carries the filament wire $K^4$. The head advances toward the said jaws bringing an end of the filament wire between them. The jaws are then closed by the cross piece $K^{16}$ which is forced against the rollers $K^{14}$ and $K^{15}$ by means of the spring $K^{27}$. The portion of the wire thus clamped between the jaws forms one leg or plain section of the filament. The plate $K^{21}$ is then moved forward until the mandrel passes out through the die $K^{24}$ and enters the aperture $K^5$ in the nose of the head, after which the head is caused to rotate and at the same time recede, paying out the filament and wrapping it around the mandrel which remains stationary. After the desired number of turns or rings in the wire have been made, the rotation of the head stops but it continues to recede a certain distance thus forming the other leg or plain section of the filament. The retraction of the head then stops at which time the plate $K^{21}$ is moved backward so as to withdraw the mandrel from the coil and the die $K^{24}$. The filament wire is then severed beyond the coiled section after which the jaws are opened so as to allow the completed coil to be carried by an automatic transfer mechanism toward a pair of lead wires which are waiting at station K to receive it.

The arrangement and relation to each other of the essential driving parts is shown more clearly in Figs. 2, 24 and 25. The gears $K^{28}$ and $K^{29}$ rotate only intermittently when clutch $K^{30}$ is engaged, whereas all of the other rotating parts are in continuous movement. The coiling head after winding the correct number of turns on the mandrel must stop. Then after the mandrel is withdrawn and the finished coil cut off, the coiling head must start winding again on the next coil. This starting and stopping of the head $K^3$ is controlled by the clutch $K^{30}$, which is operated through a suitable connecting system of levers $K^{31}$ by a cam $K^{32}$. The clutch member $K^{30}$ which is fastened to the coiling head driving gear $K^{29}$ is brought to a definite stop by a spring actuated plunger pin $K^{33}$ engaging a slot (not shown) in the stationary part $K^{34}$. To help deaden the shock of the sudden stop of the rapidly rotating parts such as the shaft $K^{35}$ which carries the head $K^3$ and the gear $K^{28}$, the spring actuated pin $K^{33}$ has first to rub over a projection (not shown) in the stationary part $K^{34}$ before it finally engages in the slot and comes to a complete rest. The clutch parts $K^{30}$ and $K^{37}$, as well as the gears $K^{29}$ and $K^{38}$ to which they are attached, are entirely independent of the shaft $K^{39}$ and use the shaft only as an axle on which to revolve.

The reciprocation of the coiling head $K^3$ is accomplished as follows: As shown in Figs. 24 and 25, the head is in its advanced position which is the position it occupies when the jaws $K^8$ and $K^9$ have closed upon the end of the filament wire. A cam $K^{40}$ and gear $K^{41}$ both fastened rigidly to a sleeve $K^{42}$ are caused to revolve independently of the coiling head shaft $K^{35}$. During the coiling operation the cam $K^{40}$ engages a roller $K^{43}$ mounted on a stationary bracket $K^{44}$ and is slowly pushed back. The sleeve $K^{42}$ transmits this backward motion through the end-thrust ball bearing $K^{45}$ to the gear $K^{28}$, which is fastened rigidly to the shaft $K^{35}$ which carries the coiling head. This causes the coiling head to move over the length of the mandrel $K^{23}$. After passing the rise in the cam $K^{40}$, the coiling head and complete sliding assembly are returned to the position shown in Fig. 24 by the heavy coil spring $K^{46}$ which surrounds the sleeve $K^{42}$.

The coiling head is driven at a relatively high speed from the mount machine drive shaft 14′ (Fig. 2) through the train of gears $K^{47}$, $K^{48}$, and $K^{49}$, which drive the gear $K^{28}$ through gear $K^{38}$, clutch members $K^{37}$, $K^{30}$, and gear $K^{29}$. The cam $K^{32}$ which throws the clutch in and out of engagement, and the cam $K^{40}$ which reciprocates the coiling head, are driven at a much slower speed from the counter shaft 12 through the pinion $K^{50}$ meshing with pinion $K^{51}$ mounted on the lower end of the vertical shaft $K^{52}$ which extends up through the base 10 and carries at its upper end a worm gear $K^{53}$, which continuously rotates the shaft $K^{39}$ through the gear $K^{54}$ mounted thereon. A gear $K^{55}$ mounted on the shaft $K^{39}$ meshes with the gear $K^{41}$ so as to continuously rotate the cam $K^{40}$.

After the coiling of the filament is completed, the coil is severed along its straight portion midway between the nose of the head and the end of the coiled portion. This gives the coil its other leg or straight portion which is substantially parallel to the axis of the coil and at the same time leaves a sufficient amount of wire projecting from the nose of the head so that it may be conveniently gripped by the jaws $K^8$ and $K^9$ when the head advances to form the next coil. As shown in Fig. 24, the severing means comprises two cutter discs $K^{56}$ and $K^{57}$ which move toward each other and shear the wire. The discs are mounted on arms $K^{58}$ and $K^{59}$ carried on shafts $K^{58'}$ and $K^{59'}$ respectively, and supported in a standard $K^{60}$. The operation of the mechanism is as follows. A cam $K^{61}$ mounted on shaft $K^{39}$ pushes down a bell crank $K^{62}$ through the roller $K^{63}$, said crank being connected to an arm $K^{64}$ through a link $K^{65}$. The arm $K^{64}$ is clamped firmly to the shaft $K^{58'}$ and as it is being pulled down, automatically raises the cutter arm $K^{58}$. A large gear $K^{66}$ fastened to the shaft $K^{58'}$ engages a small gear $K^{67}$ fastened to the end of shaft $K^{59'}$ thereby raising the cutter arm $K^{59}$.

Prior to the severing operation a pair of jaws forming part of an automatic transfer mechanism are arranged to be brought into position so as to grasp the completed coil after it is severed from the rest of the wire on one end and released by the holding jaws $K^8$ and $K^9$ at its opposite end. This automatic transfer mechanism is shown more clearly in Figs. 29, 30 and 31, and comprises a transfer arm $K^{68}$ carried by a shaft $K^{69}$ rotatably mounted in a bearing $K^{70}$ forming part of a standard $K^{71}$. The arm $K^{68}$ has pivotally mounted at its lower end a pair of jaws $K^{72}$ and $K^{73}$ which are brought into position adjacent to the coiling machine so as to grasp a filament coil after which the arm is rotated toward the mount machine so as to permit the jaws to place the filament coil between a pair of lead wires where it is securely attached to their upper hook shaped ends. The jaw $K^{72}$ has an extension $K^{74}$, the end of which is connected to one arm of a crank $K^{75}$ through a forked link $K^{76}$. The crank is pivotally mounted at $K^{77}$ on the arm $K^{68}$. The opposite arm of the said crank carries a roller $K^{78}$ which rides on a cam $K^{79}$. The cam is rigidly fastened to the end of the shaft $K^{69}$. The jaw $K^{73}$ is pivotally mounted at $K^{80}$ on the arm $K^{68}$ and is operated from the jaw $K^{72}$ through the links $K^{81}$ and $K^{82}$. A lever arm $K^{83}$ pivotally mounted at $K^{84}$ on the arm $K^{68}$ connects at its opposite end to the extension $K^{74}$ of the jaw $K^{72}$. As the arm $K^{68}$ travels toward the coiling machine the jaws $K^{72}$ and $K^{73}$ are in their open position, the jaw $K^{73}$ being raised somewhat higher than the jaw $K^{72}$ so as to clear the filament coil as it passes over it. When the jaws reach their respective positions on opposite sides of the coil, the arm $K^{68}$ is stopped from further movement by means of an adjustable stop $K^{85}$ which extends from the bracket $K^{12}$. The arm is carried on the shaft $K^{69}$ by friction accomplished by a spring $K^{86}$ which holds it against the cam $K^{79}$. This does not affect the continued rotation of the shaft which now rotates the cam $K^{79}$. As the cam rotates it causes the roller $K^{78}$ to ride off the high point thereon, operating the crank $K^{75}$ so as to rotate the jaw $K^{72}$ on its pivot $K^{87}$ thereby bringing it toward the coil. The jaw $K^{72}$ carries the jaw $K^{73}$ toward the coil through the link $K^{81}$ and $K^{82}$. A continued movement of the cam causes the roller to ride up a slight rise thereon thus rotating the lever arm $K^{83}$ on its pivot $K^{84}$ which in turn lowers the jaw $K^{72}$, carrying with it the jaw $K^{73}$. The shaft $K^{69}$, which operates the arm $K^{68}$ and cam $K^{79}$, is actuated by means of a slotted cam $K^{88}$ mounted on the shaft $K^{39}$. A lever arm $K^{89}$ pivotally mounted at $K^{90}$ carries a roller $K^{91}$, which rides into a slot $K^{92}$ in the cam $K^{88}$. The shape of the cam slot $K^{92}$ is such that at the proper time the shaft is rotated through the roller $K^{91}$, lever arm $K^{89}$, link $K^{93}$, and arm $K^{94}$ attached to the end of the said shaft.

After the jaws have been closed so as to grasp the filament coil and carry it in a substantially horizontal position, the arm $K^{68}$ is rotated toward the mount machine. As the arm reaches the position shown in Fig. 29, it is stopped from further movement by means of an adjustable stop $K^{95}$ extending from a bracket $K^{96}$ forming part of the standard $K^{71}$. At this point the filament coil lies in a plane at substantially right angles to the plane of the lead wires, the legs or straight sections of the filament extending through the hooks formed on the upper ends of the lead wires. The cam $K^{79}$ now rotates causing the roller to ride upon a slight rise on the said cam, thus rotating the crank 75 so that its lower arm pulls down on the link 76 causing the lever arm $K^{83}$ to rotate about its pivot $K^{84}$ through the extension $K^{74}$ of the jaw $K^{72}$. As the lever arm rotates it moves both jaws vertically upward a short distance. During this time the legs or straight portions of the coil are trapped by the hooks formed on the upper ends of the lead wires so that the jaws on being raised carry the coiled portion of the filament up a slight distance beyond the upper ends of the lead wires so that the filament when clamped to the lead wires will form an arch-shaped bridge between them, as shown in Fig. 35. The hooks formed on the ends of the lead wires are now pressed together so as to securely hold the legs or straight portions of the filament coil between them. The cam $K^{79}$ continues to rotate so that its high point passes under the roller $K^{78}$ thereby rotating the crank $K^{75}$ so that its lower arm pulls down the extension $K^{74}$ through the link $K^{76}$. The lever arm $K^{83}$ which rotates both jaws about its pivot up to this point is now stopped from further movement by a stop $K^{97}$ which contacts with a pin $K^{98}$ carried by the said arm. A continued downward movement of the crank arm pulls down the extension $K^{74}$ through the link $K^{76}$. The jaw $K^{72}$ now moves upwardly about the pivot $K^{87}$ at the same time forcing the jaw $K^{73}$ downwardly through the links $K^{81}$ and $K^{82}$. The jaws are now opened and remain in this position while the arm $K^{68}$ is swung back toward the coiling machine where another coil is in the process of formation.

After the filament coil has been placed in its proper position so that its coil portion forms an arch above the two lead wires and each leg or straight portion extends between the hooks formed on the upper ends of the said lead wires, the hooks are closed about the legs or straight portions so as to securely hold the filament. The closing of the hook ends of the lead wires is accomplished by means of an automatic clamping device located at station K and clearly shown in Figs. 29, 30, and 32. The clamping device comprises a pair of clamping members $K^{99}$ and $K^{100}$. The hook shaped ends of the lead wires extend up between the clamping members whose opposite faces are accurately aligned with each lead wire. As the arm $K^{68}$ travels toward the lead wires, the jaws $K^{72}$ and $K^{73}$ which carry the filament coil enter the vertical slots $K^{101}$ formed in the clamping members and travel upward therein until the mounting position of the filament is reached. The clamping members are then brought together thereby closing the hooks formed on the upper ends of the lead wires which now securely hold the filament. The opening and closing of the clamping members is as follows: The clamping member $K^{99}$ is attached to the end of a short shaft $K^{102}$ extending through a bracket $K^{103}$ fastened to the standard $K^{71}$. This shaft carries at its opposite end a lever arm $K^{104}$. The raising of the lever arm rotates the shaft $K^{102}$ so as to swing the clamping member $K^{99}$ outwardly away from the lead wires. As this clamping member swings outwardly, it forces the clamping member $K^{100}$ away from the lead wires in the opposite direction by means of the link $K^{105}$ extending between the two clamping members. The link is slotted at $K^{106}$ so that when the clamping member $K^{100}$ is forced outward, the end of the slot strikes against the pin $K^{107}$. The clamping member $K^{100}$ is pivotally mounted at $K^{108}$ and has an extension $K^{109}$ which is forced against the action of spring $K^{110}$ when the said member is forced open. The lowering of the lever arm $K^{104}$ rotates the shaft $K^{102}$ so as to bring the clamping member $K^{99}$ in toward the lead wires. This inward movement of the member $K^{99}$ causes the link $K^{105}$ to move so that the end of its slot $K^{106}$ moves away from the pin $K^{107}$ allowing the spring $K^{110}$ to force the clamping member $K^{100}$ inwardly so that when its faces come in contact with the faces of the clamping member $K^{99}$ there is sufficient force to properly close the hooks of the lead wire upon the ends of the filament. The lever arm $K^{104}$ is actuated by means of a cam $K^{111}$ which is mounted on the shaft $K^{39}$ and operates an adjustable push rod $K^{112}$ through the roller $K^{113}$ and crank $K^{114}$.

The lead wires now have their filament secured thereto and the complete assembly may be termed a mount, such as shown in Fig. 35. As the table rotates the holder containing the mount moves to the next station indicated as L on Fig. 1. Instead of unloading the mount at this station, it may be desirable to again clamp the hooks about the lead wires so as to insure their properly holding the filament. To this end I provide at station L a clamping device, best shown in Figs. 33 and 34, which comprises a pair of clamping members $L^1$ and $L^2$ arranged to be brought into contact with the hooked ends of the lead wires with considerable more force than was used by the clamping members located at station K. These clamping members $L^1$ and $L^2$ are slidably mounted in a housing $L^3$ carried by a bracket extending from the standard $K^{71}$. The clamping members are normally open, being held in this position by means of a spring $L^4$ attached at each end of the pins $L^5$ and $L^6$ carried by the said clamping members and extending through the slots $L^7$ and $L^8$ formed in the housing $L^3$. The inner ends of the clamping members carry a pair of rollers $L^9$ and $L^{10}$ which ride on a cam $L^{11}$ fastened to the end of a shaft $L^{12}$, the opposite end of the shaft being fastened to a lever arm $L^{13}$. As shown in Figs. 33 and 34, the lever arm is held in position against the action of a spring $L^{14}$ by means of a pin $L^{15}$ extending therefrom and contacting with a stop formed in the tripping latch $L^{16}$. When the lever arm is in the position shown in Fig. 33, the rollers $L^9$ and $L^{10}$ are riding on the low point on opposite sides of the cam $L^{11}$. At the proper time the tripping latch $L^{16}$ is raised on its pivot $L^{17}$ against the action of spring $L^{18}$. This releases the pin $L^{15}$ so as to allow the lever arm to be pulled back by the spring $L^{14}$. As the lever arm flies back the cam $L^{11}$ rotates, thus forcing the rollers $L^9$ and $L^{10}$ away from each other and bringing the clamping members in toward each other so as to contact with the hooked ends of the lead wires with considerable force thereby further flattening them about the straight ends of the filament. After the clamping members have closed, they are immediately opened by the lever arm which is moved forward so as to rotate the cam $L^{11}$ in order that the rollers $L^9$ and $L^{10}$ may ride off the high point on opposite sides of the cam and be brought toward each other by the spring $L^4$, thereby moving the clamping members away from each other to their open position. The lever arm $L^{13}$ is pushed forward against the action of the spring $L^{14}$ by means of a cam $L^{19}$ (Fig. 1) mounted on the shaft $K^{39}$ and which through a series of levers and links $L^{19'}$ operates a crank $L^{20}$. A pin $L^{21}$ extending from the upper arm of the crank $L^{20}$ is brought in contact with the lever arm $L^{13}$ and when the upper arm of the crank moves forward, it forces the lever arm forward through the said pin until the pin $L^{15}$ carried by the lever arm rides under the stop formed in the tripping latch $L^{16}$ thereby locking the lever arm in the position shown in Figs. 33 and 34. As the upper arm of the crank $L^{20}$ moves backward, the pin $L^{21}$ strikes against the rear end of the latch thereby raising it so as to release the pin $L^{15}$, causing the lever arm to fly backward and close the clamping jaws, as above described.

The mount is now completed and the table 23 rotates so as to bring the holder containing the finished mount to the final or discharging station, indicated as M on Fig. 1. As the table 23 travels toward station M, the wedge 27 is forced back from between the holding jaws 24 by means of the jaw opening cam 30 which forces the pin 29 backward. This allows the jaws to be opened by the spring 26. As the table stops at station M, the mount is removed by an automatic discharge device located at this station.

As shown in Fig. 34, the automatic discharge device comprises an arm $M^1$ mounted on its upper end to a shaft $M^2$ rotatably supported in a bearing formed in the bracket $M^3$ carried by the standard $K^{71}$. The opposite end of the shaft carries a lever arm $M^4$ held in position by a stop $M^5$ extending from the bracket $M^3$. The discharge device is so timed that when the table 23 stops, the lever arm $M^4$ is raised upward causing the arm $M^1$ to swing outwardly through the rotation of the shaft $M^2$. As the arm swings outward, a member $M^6$ adjustably attached to its lower end comes in contact with the beaded portion of the completed mount which is now freely resting on the separator extending between the open jaws 24. The arm continues to swing outward until the mount is brushed or swept off the separator 25 into a chute $M^7$ located at station M to receive it. The lever arm $M^4$ is raised by means of an extension $M^8$ carried on the arm $K^{94}$ which when rotated in the direction of the lever arm causes the said extension to contact with a roller $M^9$ attached to the end of the lever arm and raise it against the action of a spring $M^{10}$.

After the completed mount has been removed, it is now ready to be sealed into a lamp, all of the operations of its manufacture having been performed automatically. With this machine an operator need only at various times replace new spools which supply the wire for the leads, and keep a sufficient supply of beads in the bead feeding hopper, and also replace from time to time a new spool of filament wire which is used in making the filament coils.

What I claim as new and desire to secure by Letters Patent of the United States is:

1. In a machine of the character described, the combination of means for forming filament coils, means for successively presenting pairs of lead wires at a given point, means for successively transferring coils to said pairs of lead wires, and mechanism for causing the aforesaid means to operate in properly timed relation.

2. In a machine of the character described, the combination of means for forming filament coils, means for successively presenting pairs of lead wires at a given point, means for successively transferring coils to said pairs of lead wires, means for uniting said coils to said lead wires, and mechanism for causing the aforesaid means to operate in properly timed relation.

3. In a machine of the character described, the combination of means for forming filament coils, means for successively presenting pairs of lead wires at a given point, means for successively transferring coils to said pairs of lead wires, means for uniting said coils to said lead wires, means for shaping said coils, and mechanism for causing the aforesaid means to operate in properly timed relation.

4. In a machine of the character described, the combination of means for forming filament coils, means for successively presenting pairs of lead wires at a given point, means for successively transferring coils to said pairs of lead wires, means for clamping the ends of said lead wires to the ends of said coils, and mechanism for causing the aforesaid means to operate in properly timed relation.

5. In a machine of the character described, the combination of means for successively presenting pairs of lead wires at a given point, a bead hopper, means for causing beads to be delivered from said hopper to each pair of lead wires as it is presented, means for uniting said beads to said lead wires, and mechanism whereby said means are caused to operate in properly timed relation.

6. In a machine of the character described, the combination of means for successively presenting pairs of lead wires at a given point, a bead hopper, means for causing beads to be delivered from said hopper to each pair of lead wires as it is presented, means for fusing said beads to said lead wires, and mechanism whereby said means are caused to operate in properly timed relation.

7. In a machine of the character described, the combination of means for successively presenting pairs of lead wires at a given point, a bead hopper, means for causing beads to be delivered one by one from said hopper to each pair of lead wires as it is presented, means for uniting said beads to said lead wires, and mechanism whereby said means are caused to operate in properly timed relation.

8. In a machine of the character described, the combination of a bead hopper means for successively presenting pairs of lead wires to receive beads from said hopper, means for subsequently flattening the ends of said lead wires, and mechanism for causing the aforesaid means to operate in properly timed relation.

9. In a machine of the character described, the combination of a bead hopper means for successively presenting pairs of lead wires to receive beads from said hopper, means for subsequently flattening the ends of said lead wires, means for forming said flattened ends into hooks, and mechanism for causing the aforesaid means to operate in properly timed relation.

10. In a machine of the character described, the combination of a bead hopper means for successively presenting pairs of lead wires to receive beads from said hopper, means for subsequently shaping the ends of said lead wires to receive a filament, and mechanism for causing the aforesaid means to operate in properly timed relation.

11. In a machine of the character described, the combination of a carrier provided with means for supporting a pair of lead wires, means for moving said carrier, means disposed in the path of travel of said lead wires for shaping the ends thereof to receive a filament, means for delivering and uniting a filament to said ends, and mechanism for causing said means to operate in properly timed relation.

12. In a machine of the character described, the combination of means for supporting a pair of lead wires, a bead hopper, and means for transferring a bead from said hopper to said lead wires.

13. In a machine of the character described, the combination of means for supporting a series of pairs of lead wires, a bead hopper, and means movable between said lead wires and said bead hopper for transferring beads successively from said hopper to said lead wires.

14. In an apparatus of the character described, the combination of a carrier having means for receiving and supporting a pair of wires in properly spaced relation, a filament delivering means comprising a member carrying jaws adapted to open and close to receive and deliver a filament, means for moving said member and for actuating said jaws to deliver individual filaments from a supply thereof to said wires, means for subsequently uniting said filaments to said wires and means whereby all of said means are caused to operate in properly timed relation.

15. In an apparatus of the character described, the combination of a carrier having means for receiving and supporting a pair of wires in properly spaced relation and having their ends shaped to receive a filament, a filament delivering means comprising a member carrying jaws adapted to open and close to receive and deliver a filament, means for moving said member and for actuating said jaws to deliver individual filaments from a supply thereof to said wires, means for subsequently closing the shaped ends of the said wires on said filaments and means whereby all of said means are caused to operate in properly timed relation.

16. In an apparatus of the character described, the combination of a carrier having means for receiving and supporting a pair of wires in properly spaced relation and having their ends shaped to receive a filament, a filament delivering means comprising a member carrying jaws adapted to open and close to receive and deliver a filament, means for moving said member and for actuating said jaws to deliver individual filaments from a supply thereof to said wires and for giving each filament a definite form after delivery, means for subsequently closing the shaped ends of the said wires on said filaments and means whereby all of said means are caused to operate in properly timed relation.

In witness whereof, I have hereunto set my hand this 16th day of January, 1926.

GEORGE ILLINGWORTH.